US012747131B2

(12) United States Patent
Kwak

(10) Patent No.: US 12,747,131 B2
(45) Date of Patent: Sep. 29, 2026

(54) SPEED-SENSITIVE WIRE EXTRACTION CONTROL DEVICE AND RESTRAINT DEVICE UTILIZING THE SAME

(71) Applicant: Sang-hoon Kwak, Yongin-si (KR)

(72) Inventor: Sang-hoon Kwak, Yongin-si (KR)

( * ) Notice: Subject to any disclaimer, the term of this patent is extended or adjusted under 35 U.S.C. 154(b) by 0 days.

(21) Appl. No.: 19/138,192

(22) PCT Filed: Dec. 20, 2023

(86) PCT No.: PCT/KR2023/021068
§ 371 (c)(1),
(2) Date: Jun. 12, 2025

(87) PCT Pub. No.: WO2024/144072
PCT Pub. Date: Jul. 4, 2024

(65) Prior Publication Data
US 2026/0200695 A1 Jul. 16, 2026

(30) Foreign Application Priority Data
Dec. 27, 2022 (KR) ........................ 10-2022-0185506

(51) Int. Cl.
*A01K 25/00* (2006.01)
*B65H 75/40* (2006.01)
*B65H 75/44* (2006.01)

(52) U.S. Cl.
CPC ......... *B65H 75/4428* (2013.01); *A01K 25/00* (2013.01); *B65H 75/40* (2013.01);
(Continued)

(58) Field of Classification Search
CPC ..... A01K 25/00; B65H 75/40; B65H 75/4428
See application file for complete search history.

(56) References Cited

U.S. PATENT DOCUMENTS

2007/0039564 A1 2/2007 Steunou
2012/0178041 A1* 7/2012 Cogley .................... A61D 5/00 433/1
2013/0252192 A1* 9/2013 Cogley .................... A61D 5/00 433/1

FOREIGN PATENT DOCUMENTS

JP 56-068546 U 6/1981
JP 3094903 U 7/2003
(Continued)

OTHER PUBLICATIONS

International Search Report for PCT/KR2023/021068 mailed Mar. 21, 2024 from Korean Intellectual Property Office.
(Continued)

*Primary Examiner* — Monica L Perry
(74) *Attorney, Agent, or Firm* — Revolution IP, PLLC

(57) ABSTRACT

A speed-sensitive wire extraction control device includes: a casing having a wire inlet/outlet parts through which wires passes, and a stopper part protruding inward; a bobbin disposed inside the casing and having wires wound on its outer surface; an operating body connected to rotate together with the bobbin; a first operating member and a second operating member, one end of each being rotatably connected to the operating body and the other end being a free end which operates to be adjacent to or spaced apart from the inner wall of the casing; a seating part formed on the operating body; a first elastic restoring member and a second elastic restoring member, one end of each elastic restoring member supported by a mounting part and the other end of each elastic restoring member connected to one side of the corresponding operating member.

7 Claims, 6 Drawing Sheets

(52) U.S. Cl.
CPC ..... *B65H 75/4402* (2013.01); *B65H 2513/10* (2013.01); *B65H 2701/36* (2013.01)

(56) References Cited

FOREIGN PATENT DOCUMENTS

| | | | | | |
|---|---|---|---|---|---|
| KR | 20-2000-0006794 | U | | 4/2000 | |
| KR | 10-2013-0021041 | A | | 3/2013 | |
| KR | 20190134344 | A | * | 12/2019 | ............. A01K 25/00 |
| KR | 10-2022-0003067 | A | | 1/2022 | |
| KR | 10-2388850 | B1 | | 4/2022 | |
| KR | 10-2022-0142724 | A | | 10/2022 | |
| KR | 102784417 | B1 | * | 3/2025 | ............. A01K 25/00 |

OTHER PUBLICATIONS

Office Action of Japanese Patent Application No. 2025-535181 dated Jun. 2, 2026.

* cited by examiner

SPEED-SENSITIVE WIRE EXTRACTION CONTROL DEVICE AND RESTRAINT DEVICE UTILIZING THE SAME

CROSS REFERENCE TO PRIOR APPLICATIONS

This application is a National Stage Application of PCT International Patent Application No. PCT/KR2023/021068 filed on Dec. 20, 2023, under 35 U.S.C. § 371, which claims priority to Korean Patent Application No. 10-2022-0185506 filed on Dec. 27, 2022, respectively, which are all hereby incorporated by reference in their entirety.

TECHNICAL FIELD

The present invention relates to a wire extraction control device having a control function of a winder for storing and extracting ropes or wires.

BACKGROUND ART

In general, an automatic wire winding device or automatic winder is a device that stores wire by winding it and extracts it for use when needed. These automatic winding devices are utilized in various industrial fields, such as earphone cables, electric wires, hoses, and tape measures, which are stored by winding and extracted for use when necessary.

Korean Utility Model Application No. 20-2000-0006794 discloses a conventional winding storage device for connecting cords, and FIG. 1 is a drawing of the same.

In detail, it includes a connecting cord 17 such as a tape measure engraved with scales on the inner surface or electric wire, a winding wheel 12 for winding and fixing the connecting cord 17, a housing 11 rotatably supporting the winding wheel 12, a spring fixing portion 22 formed on a support part 16, and a spring 13 mounted inside the winding wheel 12 by means of a spring fixing portion 21 formed on the outer periphery of the winding wheel 12.

In such conventional devices, for user convenience during use after extraction, components such as a lock or button are added to maintain the extracted state. When the user pulls the wound connecting cord 17 through the cord outlet hole 23, although the cord 17 is wound around the winding wheel 12 by the spring 13, it is forcibly pulled out by the user's force. Once the connecting cord 17 is extracted to the required length, the user may hold the connecting cord 17 with one hand and operate a winding-prevention slide 20 with the other hand to maintain the connecting cord in a released state. Accordingly, the cord pressing part 19 presses the connecting cord and holds the extracted state.

Conventional automatic winders share a common basic operation principle, and improvements have been limited to differences in detailed shape or locking method.

However, when the winder is quickly or excessively pulled, it often fails to operate properly or gets permanently damaged. Although improvements have been made by enhancing material durability, there is a possibility of damage to the internal structure, especially vulnerable parts such as the connection part of the winding wheel or spiral springs.

For this reason, in the case of release methods that can apply excessive force or speed, each piece of equipment often has its own unique withdrawal and storage structure, or a manual operation method is often applied considering durability and economy.

DISCLOSURE OF THE INVENTION

Technical Goals

The present invention has been made to solve the aforementioned problems and aims to provide a speed-sensitive wire extraction control device that can distribute force and suppress wire extraction when excessive force is applied to the automatic winder.

Technical Solutions

To solve the aforementioned problem, the present invention provides a speed-sensitive wire extraction control device comprising: a casing 1000 having a wire inlet/outlet parts 2010 through which wires 100 are inserted and withdrawn, and a stopper part 1100 protruding inward; a bobbin 2300 rotatably disposed inside the casing and having an outer surface on which the wire is wound; an operating body 2000 connected to rotate together with the bobbin; a first operating member 2210 and a second operating member 2220, one end of each being rotatably connected to the operating body and the other end being a free end which operates to be adjacent to or spaced apart from the inner wall of the casing; a seating part 2140 formed in the operating body to accommodate the first and second operating members; a first elastic restoring member 2121 and a second elastic restoring member 2122, one end of each supported by a mounting part 2141 and the other end connected to one side of the respective operating members, when the wire is pulled out at a speed exceeding a set value, the free ends of the first and second operating members are caught by the stopper part, thereby restricting the unwinding motion of the bobbin.

Preferably, one side of the stopper part is formed to a surface which corresponds to the end surfaces of the free ends of the first and second operation members, while the opposite side may be a rounded shape.

Additionally, the opposite side of the stopper part may be formed with a rounded shape.

According to one embodiment, a bottom surface of the mounting part is formed higher than a bottom surface of the seating part, ensuring accurate engagement.

The first and second elastic restoring members have one end supported on the inner wall of the mounting part and the other end inserted into insertion grooves formed on one side of the first and second operation members, and may be coupled to the seating part by a first pin 2111 and a second pin 2112, respectively.

The inlet/outlet parts are symmetrically formed on both sides of the casing and are configured in a slit shape with a predtermined circumferential length to provide operational flexibility.

Additionally, a guide portion 1300 may be further included, which is disposed adjacent to the inlet/outlet parts to guide the wire extending upward from the inlet/outlet parts.

The operating body may have a mounting hole 2150 into which a main shaft 1200 formed at a rotational center and protruding upward from the bottom of the casing, is inserted.

The main shaft may include: a cut-out section 1210 formed along its height direction, dividing both sides; and fastening grooves 1220 formed at the top ends of the separated sides, to which a cap covering the top of the casing may be fastened.

In an additional embodiment of the present invention, locking means for restricting the rotation of the bobbin or operating body may be further included.

Meanwhile, the present invention provides a restraint device including the above-described speed-sensitive wire extraction control device.

The wires are drawn out from both sides of the casing and forms a loop by being interconnected above the mouth area of an animal. If the opening speed of the animal's mouth exceeds the set value, the wire draw-out is restricted, thereby fixing the inner circumferential area of the loop to limit further mouth opening.

Advantageous Effects

According to the present invention, since a firm lock is possible by accurately responding to the set value of the wire extraction speed, the reliability and durability of operation are guaranteed.

Furthermore, the present invention may be applied not only to animal muzzles but also to various movement systems that involve spacing control exercises. Accordingly, it may also flexibly adapt to various industrial devices and components.

In addition, when applied to animal muzzles, it overcomes the limitations of conventional muzzles that merely suppress mouth opening of the animal, allowing natural mouth opening the pets and restricting only sudden movements, so it is safe while minimizing discomfort to the pets.

MODE FOR CARRYING OUT THE INVENTION

Figure 1:
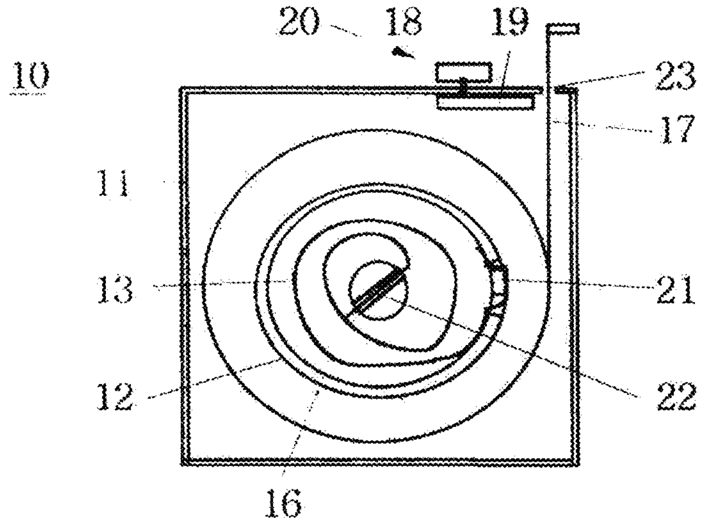
FIG. 1 is a cross-sectional view of a conventional winding storage device for connecting cords.

Hereinafter, the speed-sensitive wire extraction control device and a restraint device utilizing the same according to the present invention will be described in more detail with reference to the drawings.

The following embodiments are combinations of the elements and features of the present invention in predetermined forms. Each element or feature may be considered optional unless specifically stated otherwise. Each element or feature may be implemented independently without being combined with other components or features. Additionally, some components and/or features may be combined to form other embodiments. The sequence of operations in the embodiments may be changed. A component or feature of one embodiment may be included in another embodiment or replaced with a corresponding component or feature of another embodiment.

In the description of the drawings, parts, devices, and/or configurations that may obscure the gist of the invention have not been described, and components understandable to those skilled in the art may also have been omitted. In addition, the same reference numbers used in the drawings refer to the same elements or steps.

Throughout the specification, when it is stated that a part "comprises" a component, unless specifically stated otherwise, it does not exclude the possibility that other components may be included. Furthermore, terms like "unit," "part," "portion," "module," etc., refer to units that perform at least one function or operation. Terms such as "a," "one," "the," and similar expressions may refer to both singular and plural unless the context clearly indicates otherwise.

The invention basically provides a speed-sensitive wire extraction control device that forms an internal space allowing wire to be wound and extracted on both sides. When the extraction speed exceeds a predetermined set value, the device halts the extraction.

Figure 2:
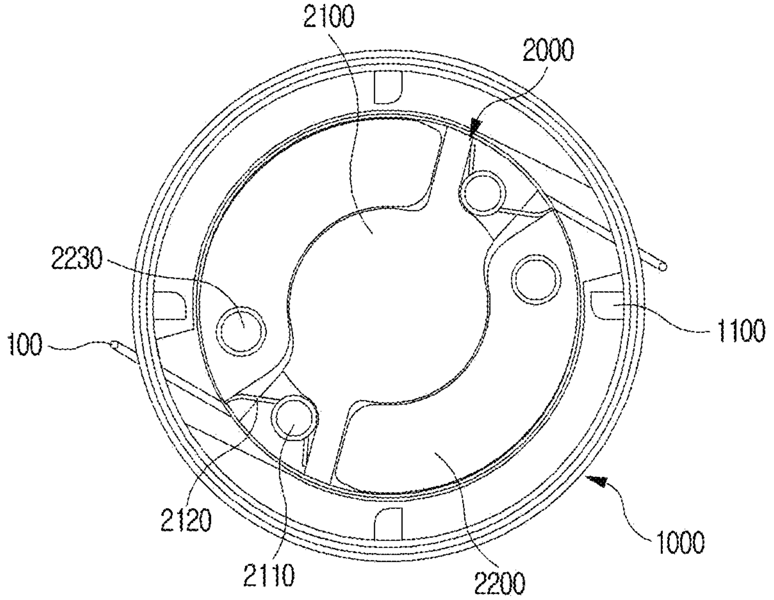
FIG. 2 is a plan view of the speed-sensitive wire extraction control device according to the present invention.

FIG. 2 is a plan view illustrating the speed-sensitive wire extraction control device based on the basic concept of the present invention.

Describing the overall configuration, the device includes: a casing 1000 having a wire inlet/outlet parts 2010 through which a wire 100 is inserted and withdrawn, and a stopper part 1100 protruding inward; a bobbin rotatably disposed inside the casing, with wire wound around its outer surface; an operating body 2000 connected to rotate together with the bobbin; a first and second operating member, one end of each being rotatably connected to the operating body and the other end being a free end which operates to be adjacent to or spaced apart from the inner wall of the casing; a seating part formed in the operating body to accommodate the first and second operating members; first and second elastic restoring members, one end of each supported by a mounting part 2141 and the other end connected to one side of the respective operating members.

The casing 1000 forms an internal space for storing the wire 100 and for the operation of the extraction control. In this invention, since the wire 100 is stored by being wound on the bobbin, it is preferable for the casing 1000 to be cylindrical. The casing 1000 includes openings on both sides through which the wire 100 can be pulled out.

Preferably, the wires 100 can be extracted from both sides of the casing 1000, and as will be described later, in an application case, the wires extracted from both sides can be connected to form a closed loop. However, it does not necessarily mean that the wires must be directly connected.

In the illustrated example, the wire 100 is shown in the form of a cable with a small diameter, but it may also take the form of a band. The shape, diameter, and material of the wire are not limited by the invention.

The inside of the casing 1000 forms a space to store the wire 100. Preferably, the bobbin for winding the wire and the components for controlling extraction are coaxially aligned. This allows rotation for extraction and the corresponding control operation to be interlinked.

The operation of the extraction control relates to the rotation speed of internal operating members, and the operating body 2000 is configured for this purpose. In the drawing, the operating body 2000 is shown positioned on the upper part of the storage structure, but this layout is optional.

According to the concept of the invention, the operating body 2000 supports at least one responsive member 2200 rotatably, and when the predetermined control conditions are satisfied, the responsive member 2200 engages with the inner wall of the casing 1000 to perform control operations.

To allow the responsive member 2200 to come into contact with the casing 1000, the stopper part 1100 may be formed protruding inward on the inner wall of the casing. The arrangement of the stopper parts 1100 is optional, but when the responsive member 2200 is composed of a pair of members positioned in the circumferential direction, it is preferable to arrange an even number of stopper parts 1100 evenly around the circumference. In the illustrated embodiment, four stopper parts 1100 are arranged evenly.

The direction in which the responsive member 2200 unfold and the circumferential shape of the stopper part 1100 may be determined by the rotational direction of the operating body 2000, more specifically the rotational direction of the operating body during wire extraction.

In the illustrated example, the operating body 2000 rotates clockwise to unwind and extract the wire. The rotation direction is optional. The responsive member 2200 is formed in an arc shape with a predetermined length in the circumferential direction. Its rotation shaft part 2230 is positioned offset in the counterclockwise direction from the free end. Therefore, when the operating body rotates due to the extraction of the wire, each responsive member 2200 is unfolded by centrifugal force around the rotation shaft part 2230, and its free end moves outward from the radius of the operating body 2000 and engages with the surface of the stopper part 1100.

The free end of the responsive member 2200 is preferably formed so that its end surface is parallel to the radial direction from the center of rotation of the operating body 2000, thereby enabling engagement with the stopper part 1100. The stopper surface of the stopper part 1100 also corresponds to the end surface of the responsive member 2200.

When extraction is allowed, the responsive member 2200 may partially unfold or not be completely stored back in the operating body 2000 for a moment, thereby coming into contact with the stopper part. However, even in such a case, it is preferable not to hinder the rotation during wire retraction. Therefore, in cases where clockwise rotation causes wire extraction, one side of the stopper part 1100 in the circumferential direction is formed as a surface parallel to the radial direction of the operating body 2000, while the opposite side has a rounded shape.

The operating body 2000 includes a space where the responsive member 2200 can be accommodated. If the rotation speed of the operating body 2000 does not reach the set threshold, the responsive member 2200 remains accommodated within the seating space and does not hinder the rotation of the bobbin. A restoring unit 2120 may be added to maintain this accommodated state.

A frame part 2100 in the operating body 2000 separates the operation and housing spaces of the responsive member 2200 and provides a space where a shaft can be engaged.

The restoring unit 2120 may be various means capable of applying rotational force to return responsive member 2200 to its accommodated state inside the operating body 2000. For example, the restoring unit 2120 may be a spring, elastic plate, elastic thread, damper, or similar. Alternatively, the responsive member 2200 may have an eccentrically distributed mass to enable self-restoration due to gravity on an inclined surface of the operating body 2000. Detailed examples of the restoring unit 2120 will be described later.

Figure 3:
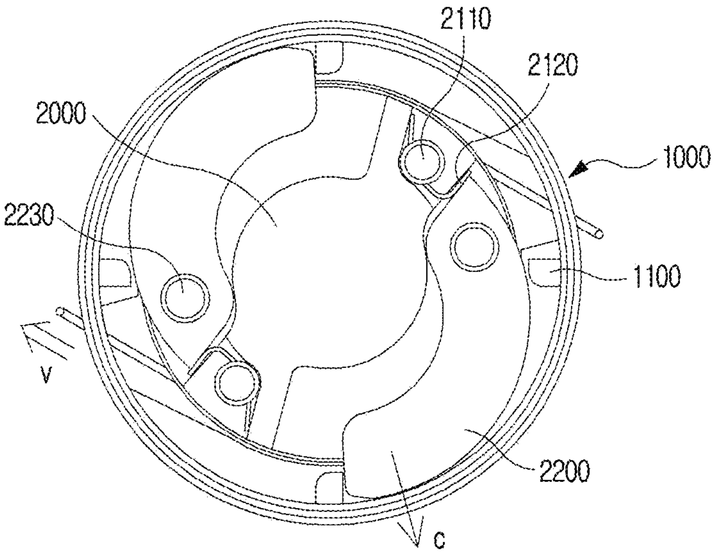
FIG. 3 is a plan view illustrating the function of the operating body in the speed-sensitive wire extraction control device of the present invention.

FIG. 3 is a plan view for explaining the operation of the speed-sensitive wire extraction control device according to the present invention.

When the wires 100 are pulled from one or both sides, the operating body 2000 rotates in rotational direction (clockwise) according to the extraction.

The wire extraction speed (v) is proportional to the rotation speed of the operating body 2000 and relates to the centrifugal force (c), which is proportional to the square of the wire extraction speed ($v^2$). Therefore, by setting the relationship between the wire extraction speed (v), centrifugal force, and the restoring force of the restoring unit 2120, the operating point of the responsive member 2200 can be defined.

If the restoring unit 2120 is a spring, the elastic constant of the spring relates to the maximum allowed extraction speed. Additionally, the mass, mass distribution, shape, and friction of the responsive member 2200 may also relate to the set extraction speed and may vary depending on the operating environment.

When the wire 100 is extracted at a speed exceeding the set threshold, the responsive member 2200 leaves the seating space of the operating body 2000, opens outward in the radial direction, and its free end moves outwards until it reaches the stopper part 1100.

When the end surface of the free end of the responsive member 2200 is caught by the surface of the stopper part 1100, the rotation of the operating body 2000 is halted, and consequently, the rotation of the bobbin also stops, thereby preventing further wire unwinding.

As long as the force for pulling out the wire is maintained, contact between the responsive member 2200 and the stopper part 1100 is maintained. When the force for pulling out the wire is released, a rotational restoring mechanism such as a spiral spring rewind the wire 100 back in the retraction direction (counterclockwise). The restoring force of the restoring unit 2120 returns the responsive member 2200 to the seating space of the operating body 2000, removing contact with the stopper part 1100 and allowing rotation of the operating body (2000) again. The accommodated state is referred to FIG. 2.

The engaged state between the responsive member 2200 and the stopper part 1100 restricting unwinding is a one-way rotational locking state. In addition, it may be considered that an additional locking means (not shown) is added to directly control the rotation restriction state. The locking means can forcibly restrict rotation according to the extraction and/or retraction direction of the wire, using known locking devices such as catches or hooks.

Figure 4:
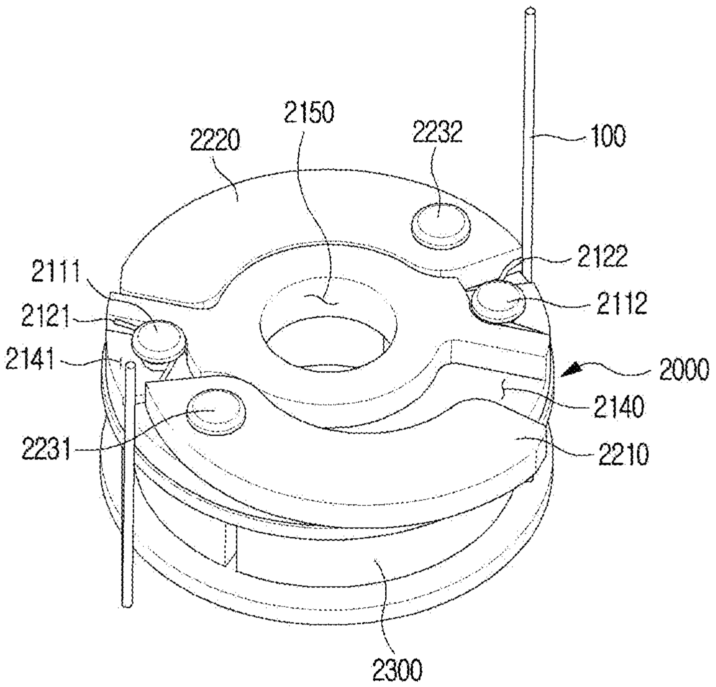
FIG. 4 is a perspective view of the operating body according to an embodiment of the present invention.

FIG. 4 is a perspective view of the operating body of the speed-sensitive wire extraction control device according to the present invention.

In this figure, the casing 1000 is omitted. The wire 100 drawn out of the casing is wound around the outer surface of the bobbin 2300 located below the operating body 2000. The wire 100 can be extracted or retracted by the rotation of the bobbin 2300.

A rotational restoring mechanism (e.g., a spiral spring) may be provided between the casing 1000 and the bobbin 2300 to automatically rotate the bobbin 2300. Various known rotational restoring technologies can be applied.

Each end of the wires 100 on both sides is fixed to the bobbin 2300.

The operating body 2000, which is coupled to the upper side of the bobbin 2300, includes a mounting hole 2150 at its center to receive a shaft protruding from the casing 1000. However, the specific shape for rotational support of the operating body 2000 against the casing 1000 may be configured in various ways.

On the upper side of the operating body 2000, a pair of responsive members 2200 are disposed and operate independently to perform rotational locking. These are defined as a first operating member 2210 and a second operating member 2220. The two members may be arranged symmetrically at 180 degrees in the circumferential direction.

A first shaft part 2231 may be provided to rotatably support the first operating member 2210 on the operating body 2000. Similarly, a second shaft part 2232 may be provided for the second operating member 2220.

To ensure spatial efficiency and avoid interference during accommodation, the coupling area between the operating body 2000 and the responsive member 2200 may have a stepped seating part 2140, and the shape of the seating part may correspond to the first and second operating members 2210, 2220, respectively.

In order to restore the first operating member 2210 to the accommodated state, a first elastic restoring member 2121 is provided, which connects the first operating member 2210 with the first pin part 2111.

To position these parts accurately, a mounting part 2141 with a step difference may be formed above the seating part 2140, with its bottom surface higher than that of the seating part.

Similarly, to restore the second operating member 2220 to its accommodated state, a second elastic restoring member 2122 is provided, which connects the second operating member 2220 with the second pin part 2112. The second pin part 2112 and the second elastic restoring member 2122 are formed on the mounting part 2141 on the other side.

A space is formed along the mounting part 2141 and seating part 2140 to allow the movement of the operating members. The first operating member 2210 and the second operating member 2220 operate in separate spaces formed by a partition wall (not shown) that creates the seating and mounting parts.

The end of the responsive member connected to the rotation shaft part may be shaped to limit the maximum opening angle. As shown in the illustrated example, the responsive member may be formed such that the outer portion is longer than the inner portion in the circumferential direction. Accordingly, when the responsive member responds to extraction speed of the wire, the outer portion near the rotation shaft part may move inward toward the center of the operating body 2000 and is caught by a wall portion formed by the seating part 2140 and the mounting part 2141, thus determining the rotation limit. The wall portion may be a corner of the portion where the mounting part 2141 and the seating part 2140 are connected. If the seating part 2140 and the mounting part 2141 have different heights, corresponding step portion may also be formed on the bottom of the responsive member.

The first elastic restoring member 2121 and the second elastic restoring member 2122 may be supported at one end by the inner wall of the mounting part 2141, and guided along the outer edge of the first pin part 2111 and the second pin part 2112. The other end of the first elastic restoring member 2121 and the second elastic restoring member 2122 may be connected to the first operating member 2210 and the second operating member 2220. The first elastic restoring member 2121 and the second elastic restoring member 2122 may be wire-type springs. Insertion grooves (not shown) into which the ends of the springs are inserted may be formed at the contact areas between the operating members and the elastic restoring.

In FIG. 4, both states are shown for convenience of explanation. In the illustrated example, the second operating member 2220 remains accommodated state because the external force applied to the second operating member 2220 is smaller than the restoring force of the second elastic restoring member 2122. The first operating member 2210, on the other hand, rotates outward because the external force exceeds the restoring force of the first elastic restoring member 2121, causing its free end to extend beyond the outer edge of the operating body 2000. As explained earlier, this external force is related to the wire extraction speed and the rotation speed of the operating body.

Figure 5:
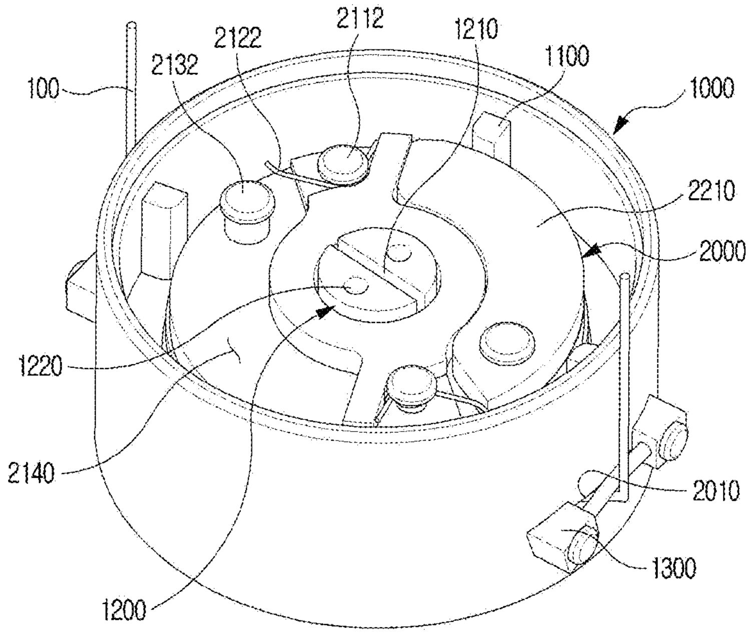
FIG. 5 is a perspective view showing a state in which the operating body and the casing are combined according to an embodiment of the present invention.

FIG. 5 is a perspective view showing the operating body coupled to the casing, according to an embodiment of the present invention.

The casing 1000 is formed in a cylindrical shape, and an internal space is provided to accommodate the locking mechanism including the operating body 2000 and the wire winding mechanism including the bobbin 2300. The top of the casing 1000 is open to allow for assembly and maintenance of internal components, and it may be covered by a cap (not shown).

The casing 1000 includes inlet/outlet parts 2010 on both sides through which the wire 100 can be extracted. These inlet/outlet parts may be symmetrically formed on both sides. Although not limited to a specific shape, it is preferable that they are slit-shaped certain with a length in the circumferential direction, considering wire movement in all directions.

The casing 1000 has protruding stopper parts 1100 which protrude from the inner wall of the casing, and the stopper parts are aligned in height with the first operating members 2210 and the second operating member 2220. One side of the stopper part 1100 may correspond to the end surfaces of the free ends of the first operating members 2210 and the second operating member 2220.

The gap between the outer wall of the operating body 2000—specifically, the outermost parts of the first and second operating members in the accommodated state- and the stopper part 1100 is optional. This gap may allow some clearance for the return movement of the first operating members 2210 and the second operating member 2220 after locking.

The main shaft 1200 which protrude from the bottom surface of the casing 1000 may be inserted into the mounting hole 2150 which defines the rotation center of the operating body 2000. The main shaft 1200 may consist of two upright members spaced apart by a slit 1210. Fastening grooves 1220 may be formed at the top of the shaft portion so that a fastening means can pass through it when the cap is mounted. This structure provides some flexibility during assembly. Once the cap is fastened, the spaced parts become fixed, enhancing structural rigidity.

In FIG. 5, the second operating member 2220 is omitted to show the seating part 2140, the second shaft part 2232, and the second elastic restoring member 2122.

In this embodiment, the wires 100 are extracted from both inlet/outlet parts 2010 and extend upward to be connected to other mechanisms or interconnected with each other. To guide the upward extension of the wires 100, a guide part 1300 may be placed adjacent to the inlet/outlet parts 2010. This guide part 1300 helps reduce unnecessary friction between the wire 100, the casing 1000, and the inlet/outlet parts during operation, thereby enhancing durability and stability.

In the illustrated embodiment, the guide part 1300 includes fixing members on both sides of the inlet/outlet parts 2010, and an elastic member connecting these fixing members. The elastic member may deform in the vertical or horizontal direction depending on the wire tension, performing a shock-absorbing function.

The speed-sensitive wire extraction control device of the present invention as described above can accurately respond to the set wire extraction speed and achieve a firm locking of the wire extraction, so that the reliability and durability of operation can be guaranteed.

The restraint device using the above speed-sensitive wire extraction control device will be described below.

Figure 6:
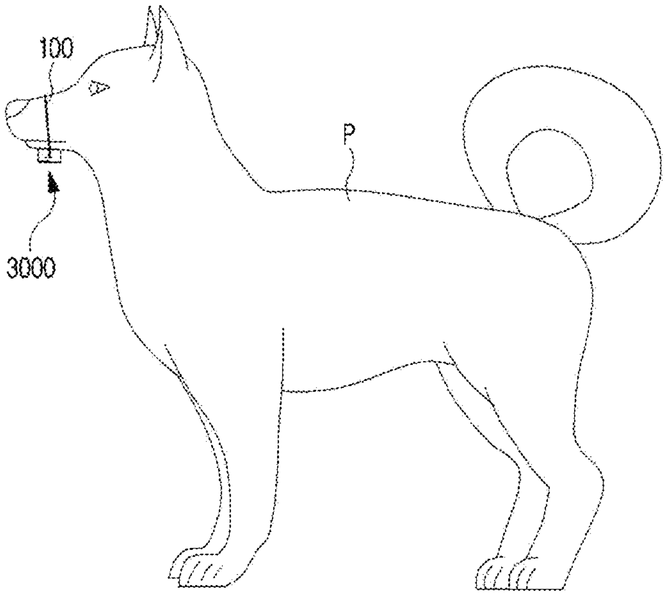
FIG. 6 is a view explaining the use of the speed-sensitive wire extraction control device as a restraint device.

FIG. 6 illustrates the application of the speed-sensitive wire extraction control device as an animal muzzle.

In this embodiment, the application is described with reference to a pet dog, but the invention can be applied to various animals such as cats or pigs.

The wires 100 are arranged in a form that wraps around the mouth of the pet (P) in a vertical loop. The wires extracted from both sides of the restraint device 3000 are connected at the top to form a closed loop.

Depending on the degree to which the wire 100 is extracted from or retracted into the restraint device 3000, the inner radius of the loop changes as seen from the front. According to the principle of the speed-sensitive wire extraction control device, mouth opening can be controlled by the extraction speed of the wire 100. The extent to which the wire 100 is extracted or retracted corresponds to the area of the closed loop surrounding the mouth, indicating how wide the mouth can open.

When the pet dog (P) opens its mouth slowly—for example, to vocalize softly or to eat-mouth opening is allowed. However, when the dog suddenly tries to bark loudly or bite aggressively, the rapid extraction speed of the wire triggers the locking mechanism, restricting the mouth opening.

The described restraint device can be applied not only to animal muzzles but also to other movement systems requiring predetermined spacing control exercises. It may also be applied to various industrial devices and components.

When used as a pet muzzle, the invention overcomes the limitations of conventional muzzles that merely suppress mouth opening of the animal. It allows natural mouth movement while limiting only sudden, potentially dangerous actions, minimizing discomfort and ensuring safety.

Additionally, because the device functions automatically without manual control, it improves user convenience. The simple structure is cost-effective and reliable in use.

The present disclosure has been described in detail based on the embodiments and the accompanying drawings. However, the scope of the present disclosure is not limited by the embodiments and the accompanying drawings. The scope of the present disclosure will be limited by only the contents described in the claims.

The invention claimed is:

1. A speed-sensitive wire extraction control device comprising:

a casing having a wire inlet/outlet parts through which wires passes, and a stopper part protruding inward;

a bobbin disposed inside the casing and having wires wound on its outer surface;

an operating body connected to rotate together with the bobbin;

a first operating member and a second operating member, one end of each being rotatably connected to the operating body and the other end being a free end which operates to be adjacent to or spaced apart from the inner wall of the casing;

a seating part formed on the operating body to accommodate the first operating member and the second operating member;

a first elastic restoring member and a second elastic restoring member, one end of each elastic restoring member supported by a mounting part and the other end of each elastic restoring member connected to one side of the corresponding operating member;

wherein the free ends of the first operating member and the second operating member are caught by the stopper part when the wire is extracted at a speed exceeding a set threshold, thereby restricting the bobbin from unwinding.

2. The device of claim 1, wherein the stopper part has a face corresponding to the free end surface of the first operating member and second operating member, and an opposite face having a rounded shape.

3. The device of claim 1, wherein the mounting part is formed such that a bottom surface of the mounting part is higher than a bottom surface of the seating part.

4. The device of claim 1, further comprising a guide part disposed adjacent to the inlet/outlet parts to guide wire extending upward from the inlet/outlet parts.

5. The device of claim 1, wherein the operating body has a mounting hole into which a main shaft formed at a rotational center and protruding upward from the bottom of the casing is inserted; and the main shaft includes a cut-out section formed in the height direction to divide the shaft into two sides, and fastening grooves formed on the upper ends of the divided sides for securing a cap over the casing.

6. The device of claim 1, further comprising a locking means to restrict the rotation of the bobbin or the operating body.

7. A restraint device comprising the speed-sensitive wire extraction control device of claim 1, wherein the wires are drawn out from both sides of the casing and interconnected at the upper side of an animal's mouth to form a loop; and when the mouth-opening speed of the animal exceeds a set threshold, the wire extraction is restricted, thereby fixing the inner circumference area of the loop to limit further opening.

* * * * *